UNITED STATES PATENT OFFICE.

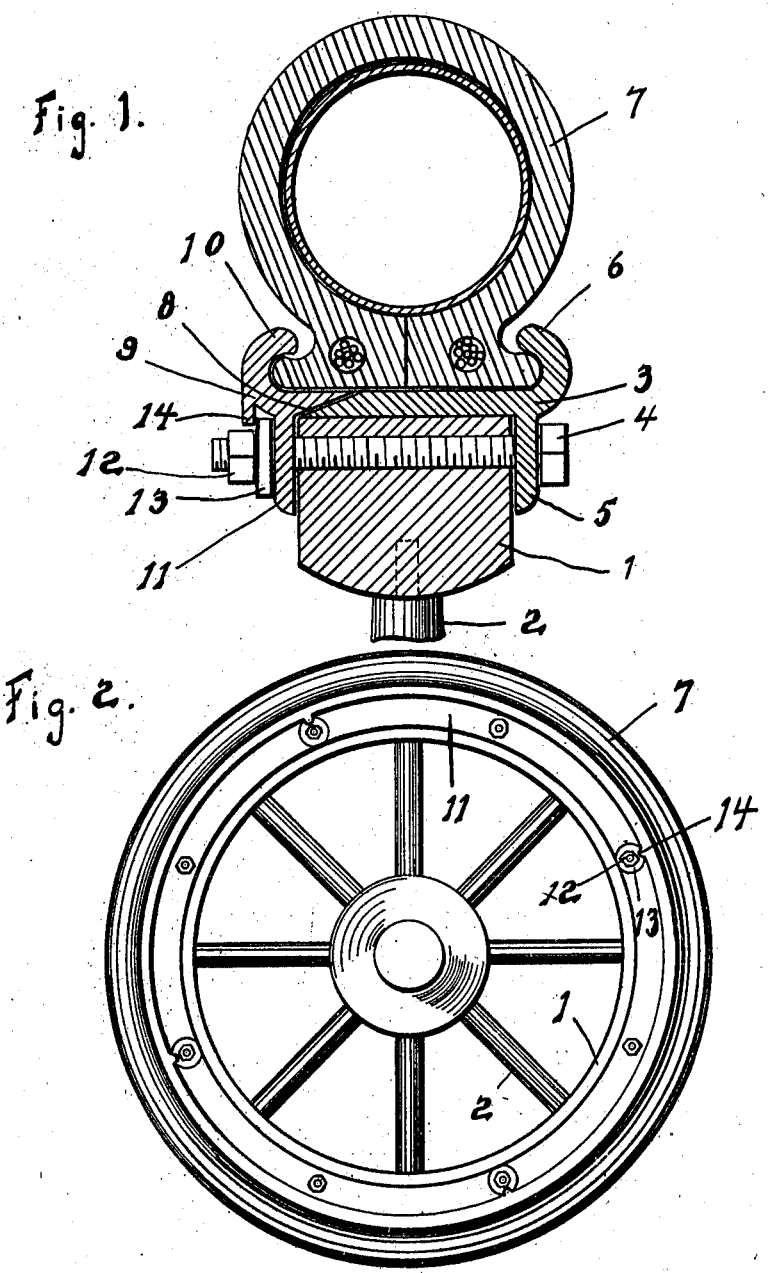

SYLVESTER CLINE FORCE, OF SAN FRANCISCO, CALIFORNIA.

PNEUMATIC-TIRE RIM.

1,004,639.  Specification of Letters Patent.  Patented Oct. 3, 1911.

Application filed January 6, 1910. Serial No. 536,643.

*To all whom it may concern:*

Be it known that I, SYLVESTER CLINE FORCE, a citizen of the United States, residing at San Francisco, in the county of San Francisco and State of California, have invented a new and useful Pneumatic-Tire Rim, of which the following is a specification in such full and clear terms as will enable those skilled in the art to construct and use the same.

This invention relates to a rim for automobile wheels, and its object is to produce a rim one side of which may be easily and forcibly removed from the wheel.

Another object of the invention is to produce a tire for the wooden wheel which will bind the parts thereof tightly and firmly together.

Another object of the invention is to produce a rim upon which the tire may be placed with the smallest amount of trouble and which will hold the tire firmly to the wheel.

In the drawings, in which the same numeral of reference is applied to the same portion throughout the several views, Figure 1 is a sectional view of a pneumatic tire, and the felly of a wheel, having the rim applied thereto, and Fig. 2 is a side view of a wheel having its rim applied thereto, and showing the rim-removing lugs.

The numeral 1 represents the felly of a wheel, and 2 the spokes thereof. On this felly is placed the rim 3, said rim being held in place in the usual manner by being shrunk on the wheel in addition being provided with bolts 4 which pass through the flange 5, and through the felly 1, the object being to hold the rim firmly in place on the felly even when the rim may be quite loose on the wheel. The rim 3 is provided with the usual incurved flange 6 for the purpose of holding the pneumatic tire 7 in place. The opposite edge of the rim 3 is cut on a bevel, as shown at 8, for a purpose which will be explained later. The opposite side of the pneumatic tire 7 is secured to the wheel by means of a detachable tire securing ring 9, which has a portion at 10 beveled so that it fits the rim 3 when the flange 11 is tight against the side of the felly. This ring 9 is held in place against the felly by means of a series of nuts 12 on the bolts 4. Four of these nuts are provided with flanges 13, which are wide enough to catch lugs 14. The object of these lugs is to provide means whereby the ring 9 may be forcibly pulled away from the side of the wheel. This is accomplished by turning the nuts 12 off the bolts, said bolts being firmly held in place in the felly and in the rim 3 by means of the threads thereon, and thus providing the necessary resistance to forcibly pull the ring 9 away from the felly. After the ring is pulled away from the felly it is a comparatively easy matter to place the pneumatic tire thereon, since the tire at the portion 8 is of much less diameter than the outside of the tire holding flanges; and since the rim adjacent the felly is beveled, it is really of much less diameter than the inside diameter of the pneumatic tire.

Having thus described my invention, what I claim as new and desire to secure by Letters Patent of the United States is as follows:

In a pneumatic tire holding rim, a wheel, a felly therefor, a rim around said felly said rim having one portion thereof beveled and having a tire holding flange and another flange in contact with the felly, a removable flanged ring adapted to fit the beveled portion of the previously mentioned rim and having a tire holding flange and a flange in contact with said felly, bolts passing through the flanges in contact with the felly, flanged nuts to secure the removable ring and beveled rim in place on the felly, and lugs carried by the removable ring to project over the flanged nuts, substantially as described.

In testimony whereof I have hereunto set my hand this 23d day of December A. D. 1909, in the presence of the two subscribed witnesses.

SYLVESTER CLINE FORCE.

Witnesses:
C. P. GRIFFIN,
A. K. DAGGETT.